(12) United States Patent
Feldman

(10) Patent No.: US 6,435,554 B1
(45) Date of Patent: Aug. 20, 2002

(54) KNEE BOLSTER APPARATUS WITH CENTER TETHER

(75) Inventor: Peter C. Feldman, Almont, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/717,919

(22) Filed: Nov. 21, 2000

(51) Int. Cl.[7] ............................................. B60R 21/22
(52) U.S. Cl. ............................ 280/743.2; 280/730.1; 280/753
(58) Field of Search ...................... 280/728.3, 730.1, 280/732, 743.2, 751, 752, 753

(56) References Cited

U.S. PATENT DOCUMENTS

| | | | | |
|---|---|---|---|---|
| 5,340,149 A | * | 8/1994 | Gajewski .................... | 280/732 |
| 5,536,043 A | | 7/1996 | Lang et al. | |
| 5,570,901 A | | 11/1996 | Eyrainer | |
| 5,730,464 A | * | 3/1998 | Hill .......................... | 280/743.2 |
| 5,738,368 A | * | 4/1998 | Hammond et al. ....... | 280/730.1 |
| 5,765,867 A | * | 6/1998 | French .................... | 280/743.2 |
| 5,931,493 A | | 8/1999 | Sutherland | |
| 5,941,557 A | * | 8/1999 | Mullins, Jr. et al. ..... | 280/728.3 |
| 6,039,380 A | * | 3/2000 | Heilig et al. .................. | 296/70 |
| 6,193,272 B1 | * | 2/2001 | Aigner et al. ............. | 280/730.1 |
| 6,213,497 B1 | * | 4/2001 | Spencer et al. .......... | 280/730.1 |
| 6,302,437 B1 | * | 10/2001 | Marriott et al. ............. | 280/732 |
| 6,338,501 B1 | * | 1/2002 | Heilig et al. ................ | 280/753 |

* cited by examiner

Primary Examiner—Paul N. Dickson
Assistant Examiner—David R. Dunn
(74) Attorney, Agent, or Firm—Tarolli, Sundheim, Covell, Tummino & Szabo L.L.P.

(57) ABSTRACT

An apparatus (10) helps protect an occupant of a vehicle. The apparatus (10) includes a knee bolster (22), an inflatable device (30), an actuatable inflator (40), and a flexible tether (50). The knee bolster (22) is movable in the vehicle from a stored position adjacent to an instrument panel (14) of the vehicle to an actuated position to engage a knee of the occupant of the vehicle. The inflatable device (30) moves the knee bolster (22) from the stored position to the actuated position. The inflatable device (30) inflates in a first direction toward the knees of the vehicle occupant. The inflator (40) inflates the inflatable device (30). The tether (50) limits movement of the knee bolster (22) in the first direction and positions the knee bolster in the actuated position. The tether (50) engages an exterior central surface portion (32) of the inflatable device (30) and restricts inflation of the central surface portion (32) of the inflatable device. The inflatable device (30) inflates laterally in the vehicle due to the tether (50) restricting inflation of the central surface portion (32) of the inflatable device.

9 Claims, 3 Drawing Sheets

KNEE BOLSTER APPARATUS WITH CENTER TETHER

FIELD OF THE INVENTION

The present invention relates to an apparatus for helping to protect an occupant of a vehicle. In particular, the invention relates to an apparatus having a knee bolster movable from a stored position adjacent to an instrument panel of the vehicle to an actuated position away from the instrument panel for engaging the knees of the occupant of the vehicle.

BACKGROUND OF THE INVENTION

A conventional apparatus includes a knee bolster and an inflatable device. The knee bolster is located at a lower portion of a vehicle instrument panel and is movable from a stored position to an actuated position in response to detection of a vehicle collision condition. The knee bolster helps protect a vehicle occupant by blocking the vehicle occupant from "submarining" underneath an inflated air bag so that the occupant is restrained by the air bag. The inflatable device moves the knee bolster from the stored position to the actuated position and may be a conventional inflatable device, such as an air bag.

SUMMARY OF THE INVENTION

In accordance with one feature of the present invention, an apparatus helps protect an occupant of a vehicle. The apparatus includes a knee bolster, an inflatable device, an actuatable inflator, and a flexible tether. The knee bolster is movable in the vehicle from a stored position adjacent to an instrument panel of the vehicle to an actuated position to engage a knee of the occupant of the vehicle. The inflatable device moves the knee bolster from the stored position to the actuated position. The inflatable device inflates in a first direction toward the knees of the vehicle occupant. The inflator inflates the inflatable device. The tether limits movement of the knee bolster in the first direction and positions the knee bolster in the actuated position. The tether engages an exterior central surface portion of the inflatable device and restricts inflation of the central surface portion of the inflatable device. The inflatable device inflates laterally in the vehicle due to the tether restricting inflation of the central surface portion of the inflatable device.

In accordance with another feature of the present invention, the tether has a first side edge portion and a second side edge portion opposite the first side edge portion. The side edge portions limit movement of the inflatable device in a second direction transverse to the first direction.

In accordance with still another feature of the present invention, an apparatus as described above further includes a plate member for absorbing an impact from the vehicle occupant when the knee bolster is in the actuated position. The plate member is connected to the knee bolster. The knee bolster and the plate member define a chamber. A first portion of the tether is secured to the plate member and thereby fixedly supported in the chamber. A second portion of the tether is fixedly connected outside of the chamber to the inflator.

BRIEF DESCRIPTION OF THE DRAWINGS

The foregoing and other features of the present invention will become apparent to one skilled in the art to which the present invention relates upon reading the following description of the invention with reference to the accompanying drawings, in which.

DESCRIPTION OF THE PREFERRED EMBODIMENT

The present invention relates to an apparatus for helping to protect an occupant of a vehicle. In particular, the present invention relates to a vehicle occupant safety apparatus including a knee bolster movable from a stored position adjacent to an instrument panel of the vehicle to an actuated position away from the instrument panel to engage the knees of the occupant of the vehicle.

Figure 1:
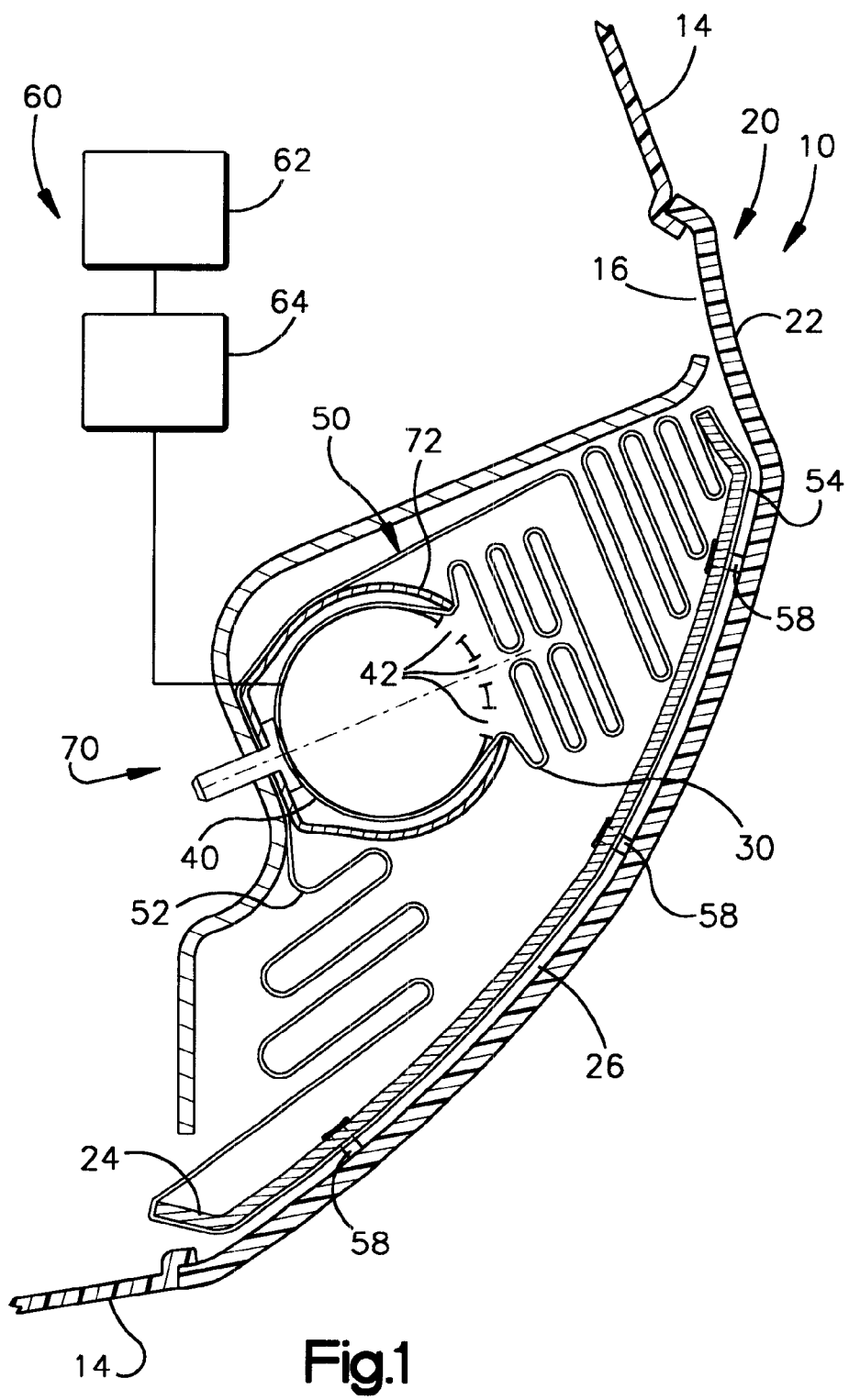
FIG. 1 is a schematic view of an apparatus in accordance with the present invention.

As representative of the present invention, FIG. 1 illustrates a vehicle occupant safety apparatus 10. The apparatus 10 includes a knee bolster assembly 20, an inflatable device (typically an air bag 30), an actuatable inflator 40, and a flexible tether 50.

The apparatus 10 is mounted in a lower portion of a vehicle instrument panel indicated schematically at 14. The lower portion of the instrument panel 14 is the portion of the instrument panel that a vehicle occupant's knees would contact were the occupant to slide forward from a seated position to contact the instrument panel (e.g., on the driver's side, below the steering wheel).

The inflator 40 is located behind the instrument panel 14 away from the vehicle occupant. The inflator 40 has a cylindrical outer housing with a plurality of fluid outlets 42 arranged to direct inflation fluid into the air bag 30.

The inflator 40 is electrically connected to an actuation circuit 60. The actuation circuit 60 includes a crash sensor 62, such as an inertia switch or an accelerometer, and a controller 64. Upon detection of a crash condition requiring occupant protection, as sensed by the crash sensor 62, the controller 64 controls the actuation circuit 60 so that the actuation circuit sends an electric signal to the inflator 40 to actuate the inflator. When the inflator 40 is actuated, the inflator emits inflation fluid under pressure from the fluid outlets 42 to inflate the air bag 30.

The apparatus 10 further includes support means 70 for supporting the apparatus 10 behind the vehicle instrument panel 14. The support means 70 includes a reaction canister or other type of mounting member illustrated schematically at 72 for mounting the inflator 40 and the air bag 30 to the instrument panel 14. The inflator 40, the air bag 30, and a first portion 52 of the tether 50 are secured in a known manner (not shown) to the reaction canister 72. In effect, therefore, the first portion 52 of the tether 50 is connected to the inflator 40.

The knee bolster assembly 20 includes a knee bolster 22 and a load distribution plate member 24. The knee bolster 22 is configured to close an opening 16 in the instrument panel 14. The knee bolster 22 is removably secured to the instrument panel 14 by a known method.

Figure 3:
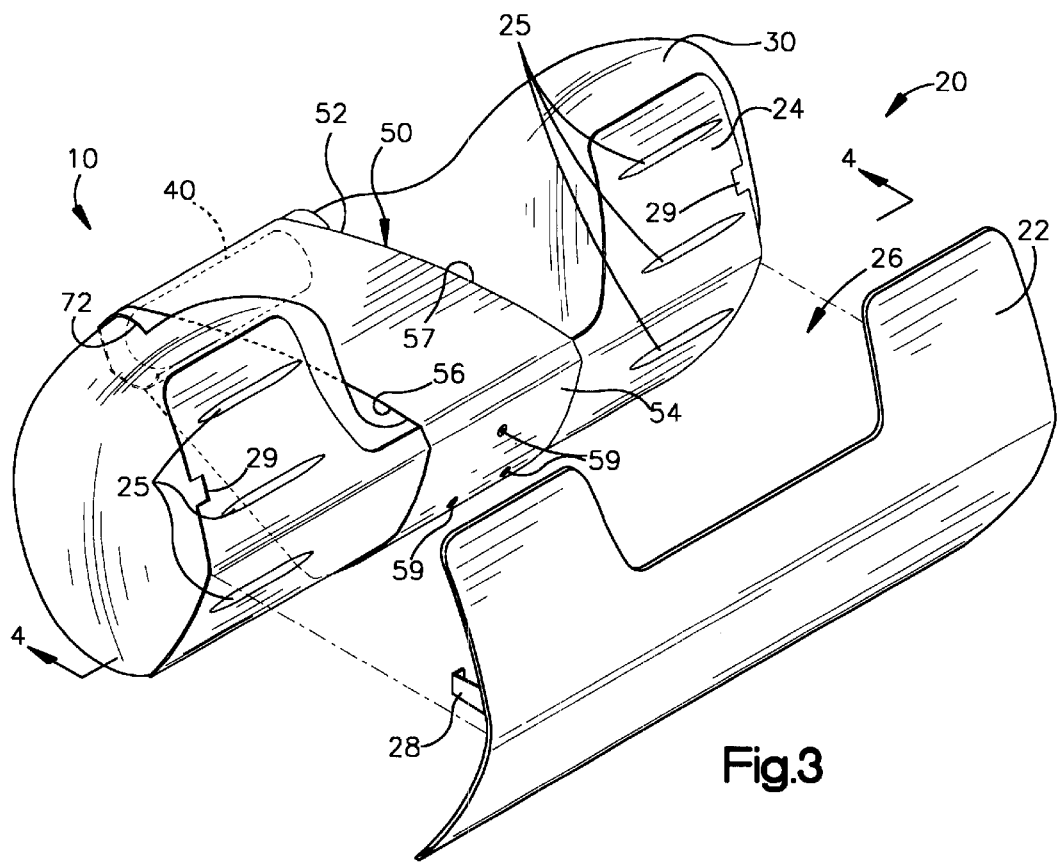
FIG. 3 is an exploded schematic view of part of the apparatus of FIG. 1.

The knee bolster 22 has a generally rectangular configuration, but curved from top to bottom (FIG. 3). The knee bolster 22 generally conforms to the shape and appearance of the instrument panel 14 in the stored position (FIG. 1). Specifically, the outside surface of the knee bolster 22 is a Class-A surface (i.e., a trim surface that is visible by the vehicle occupant).

The plate member 24 can absorb an impact from the knees of the vehicle occupant, transferred through the knee bolster 22, when the knee bolster is in the actuated position. The plate member 24 is connected to the knee bolster 22 by projections 28 (FIG. 3, only one shown) extending from the backside of the knee bolster 22. The projections 28 engage corresponding notches, or recesses 29, on the plate member 24 to secure the knee bolster 22 to the plate member 24 by a known method. The knee bolster 22 and plate member 24, when secured together, define a chamber 26.

A second portion 54 of the tether 50 is fixedly secured within the chamber 26 by a plurality of heat stakes 58 projecting from the knee bolster 22 (typically 3). The heat stakes 58 are arranged in a non-linear pattern, such as a scalene triangle, to ensure the proper orientation of the second portion 54 of the tether 50 in the chamber 26 and prevent bunching of the tether.

Figure 2:
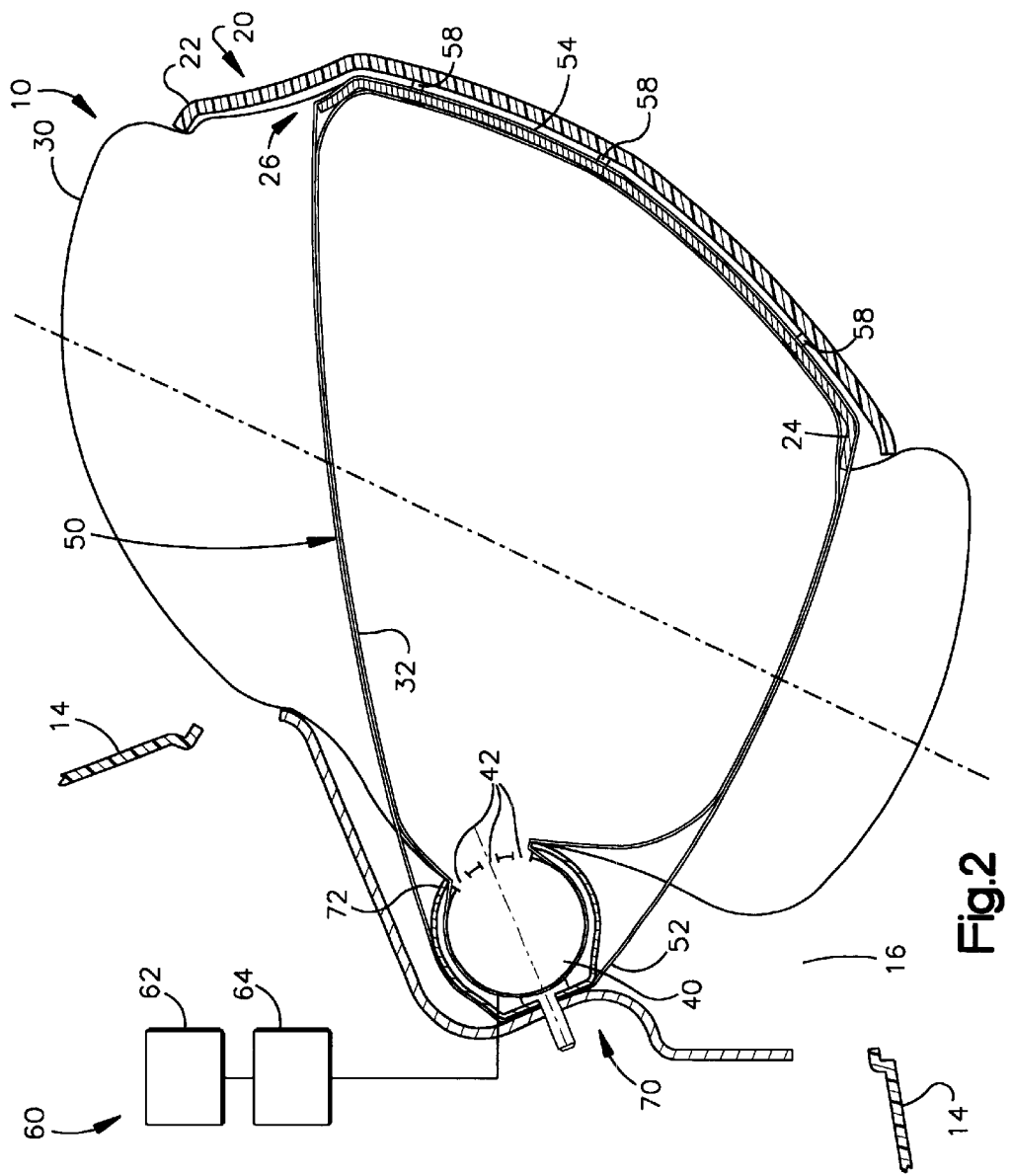
FIG. 2 is a schematic view of the apparatus of FIG. 1 showing parts in a different position.

As viewed in FIGS. 1 and 2, the heat stakes 58 are constructed as integral projections extending from the knee bolster 22. During assembly, as the knee bolster 22 is secured to the plate member 24, the heat stakes 58 are inserted through corresponding holes 59 in the second portion 54 of the tether 50 and the plate member 24. The terminal ends of each heat stake 58 are heated under pressure to form a wide flat end which secures the knee bolster 22, the second portion 54 of the tether 50, and the plate member 24 together.

The plate member 24 is typically constructed of a ductile metal, such as aluminum, so the plate member may partially deform while absorbing an impact with the occupant of the vehicle. Ribs 25 may be formed in the plate member 24 to vary the rigidity and impact absorption characteristics of the plate member 24.

Alternatively, the plate member 24 may be constructed as a single piece with the knee bolster 22 and constructed of the same material as the knee bolster. The knee bolster 22 is preferably constructed of a resilient material for cushioning contact between the knee bolster and the occupant of the vehicle. With a single-piece construction of the knee bolster 22 and plate member 24, the tether 50 may be secured in the chamber 26 as the knee bolster and plate member are molded together around the tether, with no need for the separate heat stakes 58.

The plate member 24 is generally similar in overall shape and configuration to the knee bolster 22, but slightly smaller. The plate member 24 has a curved rectangular configuration (FIG. 3), but is small enough to fit through the opening 16 in the instrument panel 14 when the inflator 40 is actuated.

The tether 50 limits movement of the knee bolster assembly 20 in a first direction away from the instrument panel 14 and positions the knee bolster assembly in the actuated position when the air bag 30 is in an inflated condition. The tether 50 is a flexible strap in the form of a loop.

The tether 50 may be formed as a flexible single piece loop. Alternatively, the tether 50 may be formed as a flexible strap of material with its ends secured together in a later step by a known method, such as stitching.

The tether 50 is preferably made from a sheet material, such as a fabric material. One suitable material is 840 denier polyester. The tether 50 has a wide, panel-like configuration, rather than a narrow, strip-like configuration. For example, the tether 50 may be about 8 inches wide or more, depending on vehicle configuration and requirements.

When the knee bolster 22 is in the stored position, the tether 50 is folded, as shown schematically in FIG. 1, between the support means 70 and the knee bolster assembly 20. The knee bolster 22, when in the stored position, closes the opening 16 of the instrument panel 14. The edge portions of the knee bolster 22 overlie the edge portions of the instrument panel 14 around the opening 16. The folded tether 50 is located outside the folded air bag 30.

Upon detection of a crash condition requiring occupant protection, as sensed by the crash sensor 62 in the actuation circuit 60, the inflator 40 is actuated. The inflation fluid from the inflator 40 flows through the fluid outlets 42 into the air bag 30 and inflates the air bag. The air bag 30 inflates in a rearward and downward direction in the vehicle, that is, to the right as indicated in FIGS. 1–3.

As the air bag 30 inflates, part of the air bag pushes outward, between the first and second portions 52 and 54 of the tether 50, against the knee bolster assembly 20. The inflating air bag 30 moves the knee bolster assembly 20 away from the instrument panel 14, from the stored condition shown in FIG. 1 to an actuated position shown in FIG. 2. The knee bolster 22, when in the actuated position shown in FIG. 2, is positioned to contact the knees of a vehicle occupant and block further movement of the vehicle occupant in a forward direction in the vehicle. This blocking action can help to protect the vehicle occupant by preventing contact between the vehicle occupant and the instrument panel 14, and by preventing the vehicle occupant from "submarining" underneath another safety device, such as an inflated air bag. Thus, the inflated air bag can function to restrain the vehicle occupant.

When the air bag 30 is at least partially inflated, the tether 50 is fully extended and tensioned. The tether 50 controls movement of the knee bolster 22 relative to the instrument panel 14 by limiting the amount of movement of the knee bolster 22 in a first direction away from the instrument panel.

As the air bag 30 continues to inflate, an exterior central surface portion 32 of the air bag 30 engages the tether 50. The tether 50 restricts inflation of the exterior central surface portion 32 of the air bag 30, with some bulging out of the tether as viewed in FIG. 2. This restriction causes the air bag 30 to inflate increasingly laterally in the vehicle, or in a direction transverse to the vehicle occupant and around the tether 50, as viewed in FIGS. 3 and 4.

The tether 50 further includes a first side edge portion 56 (FIG. 3) and a second side edge portion 57 opposite the first side edge portion. The side edge portions 56, 57 limit the transverse movement of the air bag 30 and maintain the air bag centered when the knee bolster 22 is in the actuated position and the air bag 30 is fully inflated around the tether 50, as viewed in FIG. 4.

Figure 4:
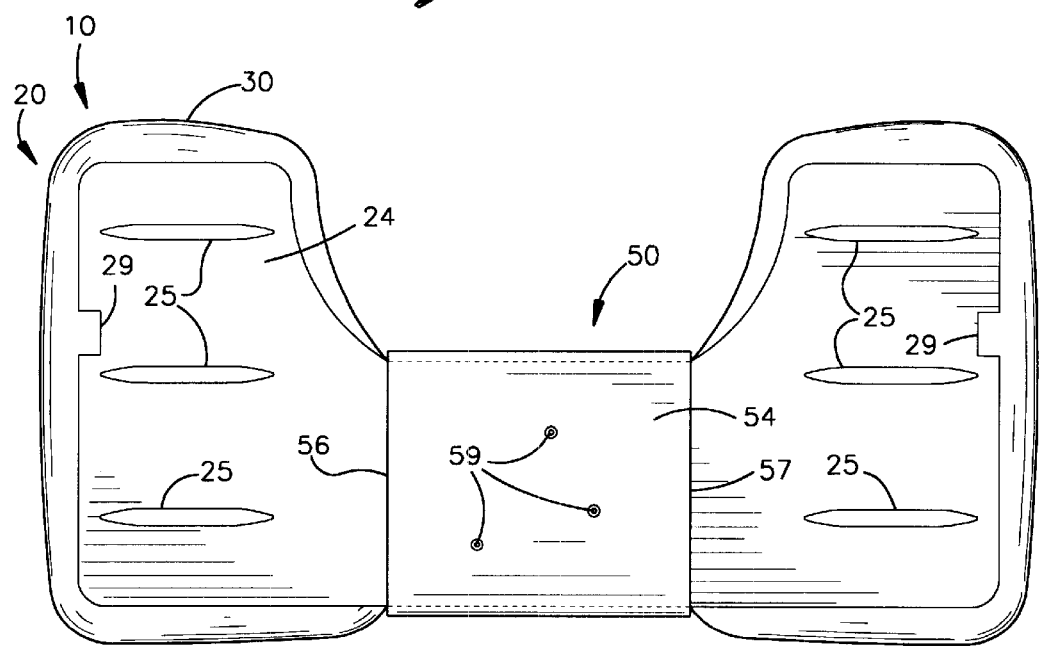
FIG. 4 is a schematic view taken along line 4—4 in FIG. 3.

Specifically, the first side edge portion 56 blocks movement of the air bag 30 horizontally to the right, as viewed in FIG. 4, by transversely engaging, or abutting, the outside surface of the air bag that has inflated outward, above and below the tether 50 adjacent the first side edge portion, as viewed in FIG. 4. The second side edge portion 57 blocks movement of the air bag 30 horizontally to the left, as viewed in FIG. 4, by transversely engaging, or abutting, the outside surface of the air bag that has inflated outward, above and below the tether 50 adjacent the second side edge portion, as viewed in FIG. 4.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect an occupant of a vehicle, said apparatus comprising:

a knee bolster movable in the vehicle from a stored position adjacent to an instrument panel of the vehicle to an actuated position to engage a knee of the occupant of the vehicle;

an inflatable device for moving said knee bolster from the stored position to the actuated position, said inflatable device inflating in a first direction toward the knee of the vehicle occupant;

an actuatable inflator for inflating said inflatable device; and a flexible tether for limiting movement of said knee bolster in said first direction and positioning said knee bolster in the actuated position, said tether having a surface engaging an exterior surface of a central portion of said inflatable device, said tether restricting inflation of said central portion of said inflatable device during inflation and while inflated, said inflatable device inflating laterally in the vehicle due to said tether restricting said central portion of said inflatable device, said inflatable device when inflated having lateral portions inflated laterally of said tether and transverse to said surface of said central portion, said tether including side edge portions that engage said lateral portions and thereby limit movement of said inflatable device relative to said tether in directions transverse to said first direction.

2. The apparatus as defined in claim 1 further including a plate member for absorbing an impact from the vehicle occupant when said knee bolster is in the actuated position, said plate member being connected to said knee bolster and helping to define a chamber between said plate member and said knee bolster, said tether extending around said plate member and said inflatable device and extending through said chamber and being fixedly connected to said plate member in said chamber.

3. The apparatus as defined in claim 1 wherein said tether includes first and second opposite side edge portions, said inflatable device when inflated having a first lateral portion inflated laterally of said first side edge and transverse to said surface of said central portion and a second lateral portion inflated laterally of said second side edge and transverse to said surface of said central portion, said first side edge portion engaging said first lateral portion to limit movement of said inflatable device relative to said tether in a second direction transverse to said first direction, said second side edge portion engaging said second lateral portion to limit movement of said inflatable device relative to said tether in a third direction transverse to said first direction and generally opposite said second direction.

4. An apparatus for helping to protect an occupant of a vehicle, said apparatus comprising:

a knee bolster movable in the vehicle from a stored position adjacent to an instrument panel of the vehicle to an actuated position to engage a knee of the occupant of the vehicle;

an inflatable device for moving said knee bolster from the stored position to the actuated position, said inflatable device inflating in a first direction toward the vehicle occupant;

an actuatable inflator for inflating said inflatable device; and a flexible tether for limiting movement of said knee bolster, said tether having a surface engaging said inflatable device and having a first side edge portion and a second side edge portion opposite said first side edge portion, said inflatable device when inflated having a first lateral portion inflated laterally of said first side edge and transverse to said surface of said tether and a second lateral portion inflated laterally of said second side edge and transverse to said surface of said tether, said first side edge portion engaging said first lateral portion to limit movement of said inflatable device relative to said tether in a second direction transverse to said first direction, said second side edge portion engaging said second lateral portion to limit movement of said inflatable device relative to said tether in a third direction transverse to said first direction and generally opposite said second direction.

5. The apparatus as defined in claim 4 wherein said surface of said tether engages an exterior surface of a central portion of said inflatable device and restricts inflation of said central portion of said inflatable device.

6. The apparatus as defined in claim 4 further including a plate member for absorbing an impact from the vehicle occupant when said knee bolster is in the actuated position, said plate member being connected to said knee bolster and helping to define a chamber between said plate member and said knee bolster, said tether extending around said inflatable device and said plate member and through said chamber, said tether being fixedly connected to said plate member in said chamber.

7. An apparatus for helping to protect an occupant of a vehicle, said apparatus comprising:

a knee bolster movable in the vehicle from a stored position adjacent to an instrument panel of the vehicle to an actuated position to engage a knee of the occupant of the vehicle;

an inflatable device for moving said knee bolster from the stored position to the actuated position;

an actuatable inflator for inflating said inflatable device;

a plate member for absorbing an impact from the vehicle occupant when said knee bolster is in the actuated position, said plate member being connected to said knee bolster; and a flexible tether for limiting movement of said knee bolster toward the knee of the occupant, said tether comprising a single piece of material forming a loop extending around said inflatable device and said plate member and said inflator, said knee bolster and said plate member defining a chamber, a first portion of said tether extending through said chamber and being fixedly secured to said plate member in said chamber, said tether having a second portion fixedly connected outside of said chamber to said inflator.

8. The apparatus as defined in claim 7 wherein said inflatable device when inflated has lateral portions inflated laterally of said tether, said tether including side edge portions that engage said lateral portions and thereby limit movement of said inflatable device relative to said plate, said knee bolster and said tether in directions transverse to said first direction.

9. The apparatus as defined in claim 7 wherein said tether limits movement of said knee bolster in a first direction toward the vehicle occupant, said tether including first and second opposite side edge portions and, said inflatable device when inflated having a first lateral portion inflated laterally of said first side edge and transverse to a surface of said tether engaging said inflatable device and a second lateral portion inflated laterally of said second side edge and transverse to said surface of said tether, said first side edge portion engaging said first lateral portion to limit movement of said inflatable device relative to said tether in a second direction transverse to said first direction, said second side edge portion engaging said second lateral portion to limit movement of said inflatable device relative to said tether in a third direction transverse to said first direction and generally opposite said second direction.

* * * * *